(12) United States Patent
Du Fretay et al.

(10) Patent No.: US 7,818,448 B2
(45) Date of Patent: Oct. 19, 2010

(54) METHOD FOR THE INSERTION AND PROCESSING OF INFORMATION FOR THE CONTROL, BY A NODE, OF THE BROADCASTING OF A DATA STREAM GOING THROUGH A BASIC NETWORK OF A HETEROGENEOUS NETWORK, AND CORRESPONDING NODES

(75) Inventors: Tristan Halna Du Fretay, Rennes (FR); Laurent Frouin, Rennes (FR)

(73) Assignee: Canon Europa NV, Amstelveen (NL)

( * ) Notice: Subject to any disclaimer, the term of this patent is extended or adjusted under 35 U.S.C. 154(b) by 1447 days.

(21) Appl. No.: 10/753,491

(22) Filed: Jan. 9, 2004

(65) Prior Publication Data

US 2004/0215813 A1    Oct. 28, 2004

(30) Foreign Application Priority Data

Jan. 23, 2003    (FR) .................................... 03 00834

(51) Int. Cl.
    *G06F 15/16*    (2006.01)
(52) U.S. Cl. .................... 709/236; 709/248; 370/473
(58) Field of Classification Search ................ 709/236, 709/248; 370/473
    See application file for complete search history.

(56) References Cited

U.S. PATENT DOCUMENTS

| | | | |
|---|---|---|---|
| 6,009,433 A | | 12/1999 | Kurano et al. ............... 707/100 |
| 6,115,057 A | * | 9/2000 | Kwoh et al. ................. 725/28 |
| 6,278,718 B1 | * | 8/2001 | Eschholz .................... 370/503 |
| 6,618,549 B1 | * | 9/2003 | Kato et al. .................. 386/94 |
| 6,751,221 B1 | * | 6/2004 | Saito et al. ................. 370/392 |
| 2001/0040896 A1 | | 11/2001 | Frouin et al. ............... 370/466 |
| 2003/0028887 A1 | | 2/2003 | Frouin et al. ............... 725/78 |
| 2005/0254645 A1 | * | 11/2005 | Shippy et al. ............... 380/28 |

FOREIGN PATENT DOCUMENTS

| | | |
|---|---|---|
| EP | 1 043 661 | 10/2000 |
| FR | 2 826 818 | 1/2003 |
| WO | WO 00/72600 | 11/2000 |

* cited by examiner

*Primary Examiner*—Yves Dalencourt
*Assistant Examiner*—Michael C Lai
(74) *Attorney, Agent, or Firm*—Fitzpatrick, Cella, Harper & Scinto

(57) ABSTRACT

A method for insertion of information for control of broadcasting of a data stream in a heterogeneous network, the network including an entry sub-network conveying first packets and a basic network conveying second packets. The sub-network is connected to the basic network by an entry node forming the second packets. The node receives first packets from the sub-network, associates an access level with each first packet from a plurality of access levels, as a function of a predetermined policy of association, forms each second packet by enclosing at least a first packet or part thereof into the second packet, the enclosed first packets or part thereof being associated with a same access level, for each second packet, inserts, into a field of the second packet representing the broadcast control information, the same access level, and transmits the formed second packets into the basic network.

28 Claims, 9 Drawing Sheets

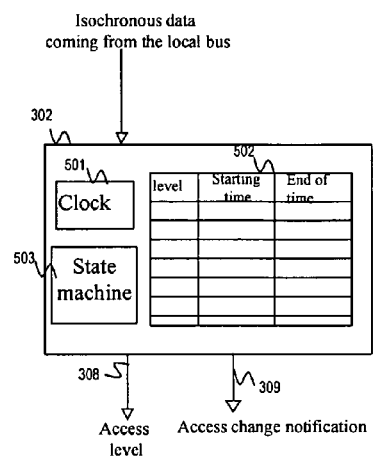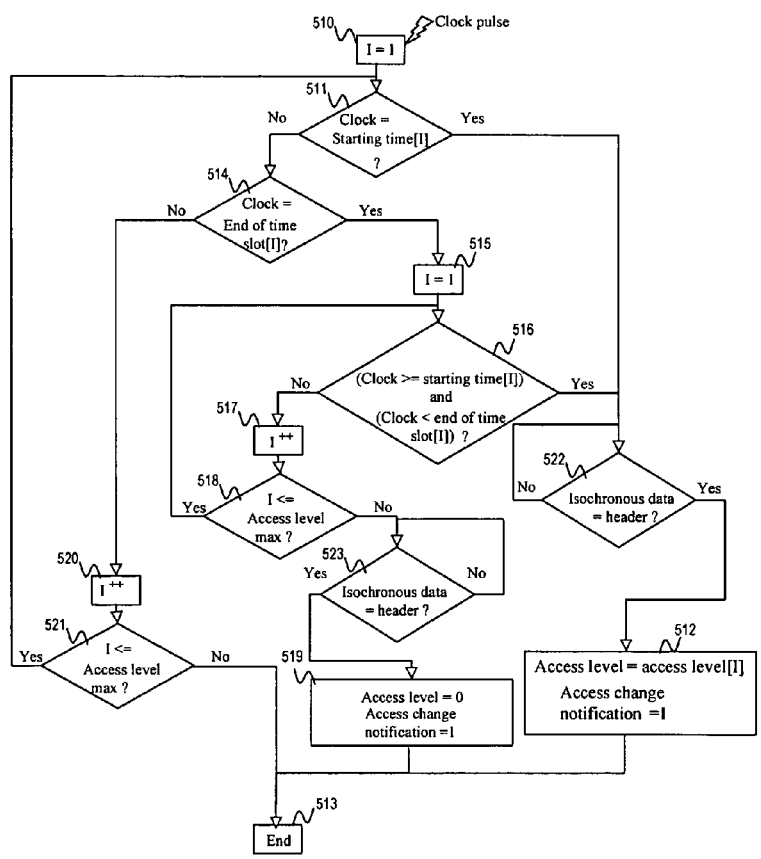
Fig 4A
Fig 4B

METHOD FOR THE INSERTION AND PROCESSING OF INFORMATION FOR THE CONTROL, BY A NODE, OF THE BROADCASTING OF A DATA STREAM GOING THROUGH A BASIC NETWORK OF A HETEROGENEOUS NETWORK, AND CORRESPONDING NODES

BACKGROUND OF THE INVENTION

1. Field of the Invention

The field of the invention is that of the control of access to signals transmitted within heterogeneous networks including at least one basic network and at least one sub network.

The invention can be applied especially, but not exclusively, to a heterogeneous network of digital buses, in which the sub-networks are digital buses. It may be recalled that a heterogeneous network of digital buses is called "heterogeneous" because certain interconnections between digital buses are made directly, through homogenous bridges, while other interconnections between digital buses are made through at least one basic network, through heterogeneous bridges.

More specifically, the invention relates to a method of inserting information for the control, by a destination node, of the broadcasting of a data stream crossing a basic network of a heterogeneous network as well as a method for the processing of this information.

The invention can be applied especially, but not exclusively, in the special case where the heterogeneous network of digital buses is a home audiovisual network, whose basic network is a switched network of the type comprising a plurality of nodes connected together by a plurality of links.

Such a home audiovisual network enables the interconnection of analog and/or digital type audio and/or video terminals (also called devices) so that they may exchange audiovisual signals. The terminals belong, for example, to the following non-exhaustive list of devices: television receivers (using satellite, RF channels, cable, xDSL and other means), television sets, video tape recorders, scanners, digital camcorders, digital cameras, DVD readers, computers, personal digital assistants (PDAs), printers, etc.

In this particular case, the links are, for example, of the type enabling two-way data transfers according to the IEEE 1355 standard. It may be recalled that the IEEE 1355 standard is defined by the reference Std 1355-1995 Standard for Heterogeneous InterConnect (HIC) (Low Cost Low Latency Scalable Serial Interconnect) (aka ISO/IEC 14575 DIS).

Furthermore, also in this particular case, the digital buses are, for example, IEEE 1394 type digital bus networks. It may be recalled that the IEEE 1394 standard is described in the following reference documents: "IEEE Std 1394-1995, Standard for High Performance Serial Bus and "IEEE Std 1394a-2000, Standard for High Performance Serial Bus (Supplement)". A third document "IEEE P1394.1 Draft 0.17 Standard for High Performance Serial Bus bridges" describes the way to connect different IEEE 1394 type buses.

2. Description of the Prior Art

In general, a heterogeneous network of this kind works as follows: a connection is set up, generally through a plurality of nodes of the basic network, between a destination terminal (or listener) that wishes to receive audiovisual signals and an entry terminal (or talker) that can give it the signals.

It is assumed that the digital buses convey first packets (for example IEEE 1394 packets) and the basic network conveys second packets (for example IEEE 1355 packets). Thus, the data stream concerned is conveyed on the digital buses by first packets. To enable the crossing of the basic network by this data stream, the entry node divides and/or concatenates these first packets to encapsulate them in second packets. Conversely, the destination node de-encapsulates the contents of the second packets that it receives, and then generates first packets.

Typically, the basic network is a switched network conveying second packets whose size is variable and determined by quality of service (QoS) imperatives. Since the second packets are variably sized, it is impossible to ensure that the first and second packets will be aligned.

A few elements of the terminology used hereinafter in the description shall now be specified.

The term "entry node" or "talker node" designates the node to which the entry or talker terminal is connected, directly or through a digital bus.

In general, the entry node does not comprise means for the reception and/or reading of source signals (originating from outside the network). It receives audiovisual signals coming from the entry terminal and introduces them into the home audiovisual network. The term "entry terminal" is understood to mean, for example, a digital camera, a digital camcorder, a digital output DVD player or any analog device seen through an analog/digital converter.

It will be noted however that, in one particular case, the terminal is integrated into the entry node, which is called a "source node". Thus, it is assumed that the source node comprises means for the reception and/or reading of source signals (originating outside the network) and means for the transmission of these source signals, in the form of the above-mentioned audiovisual signals, to the destination node. Typically the source node (also called a "Tuner Unit") includes a television receiver, for example in France a "TPS" (registered mark) receiver. It enables the direct introduction into the network, in digital form (generally encoded in the MPEG2 format) of source signals given by an operator and containing television programs.

To put it briefly, in the particular case mentioned here above, the following four situations can be distinguished on the entry node side:

the entry terminal is a digital type of terminal, connected to the entry node through a digital bus (entry sub-network). It directly generates the data stream in the form of first IEEE 1394 packets;

the entry terminal is an analog type terminal, connected to an independent adapter, which is itself connected to the entry node through a digital bus (entry sub-network). The adapter enables the conversion, into first IEEE 1394 packets, of the data stream generated in the form of analog signals by the entry terminal;

the entry terminal is an analog type terminal directly connected to the entry node. This node integrates the above-mentioned adapter;

the entry terminal is integrated into the entry node. This entry node which, in this particular case, is called a "source node" directly generates the data stream in the form of first IEEE 1394 packets.

The term "destination node" or "listener node" designates the node to which the destination or listener terminal is connected, directly or through a digital bus.

To put it briefly, in the particular case mentioned here above, the following four situations can be distinguished on the destination node side:

the destination terminal is a digital type of terminal, connected to the destination node through a digital bus (destination sub-network). It directly receives the first IEEE 1394 packets generated by the destination node and representing the data stream;

the destination terminal is an analog type terminal, connected to an independent adapter, which is itself connected to the destination node through a digital bus (destination sub-network). The adapter enables the conversion, into analog signals, of the first IEEE 1394 packets generated by the destination node and representing the data stream;

the destination terminal is an analog type terminal directly connected to the destination node. This node integrates the above-mentioned adapter;

the destination terminal is integrated into the destination node. This destination node directly processes the data stream in the form of first IEEE 1394 packets.

The control of access to the signals transmitted within a heterogeneous network is an essential question. Indeed, in a home audiovisual network, for example, there are novel technologies which now enable access to numerous multimedia contents (audio and/or video and/or text contents). Through numerous stream connections within the network, all these multimedia contents can very easily be shared within a home. Each family member can thus access data from any room in the house in which there is a node of the network. It can easily be seen, however, that certain persons should be prevented from accessing programs unsuited to them. For example, children have to be barred from seeing films depicting violence. A control system (hereinafter also called a "parental control system") is therefore necessary.

Now, to date, there is no satisfactory selective technical solution for setting up a parental control system such as this, especially in a home audiovisual network.

In the prior art, there is a parental control technique known from the U.S. Pat. No. 6,009,433 in which:

on the source equipment side, parental control information is inserted directly into the MPEG2 data packets;

the MPEG2 data packets are transmitted through the transmission network; and on the destination equipment side, the parental control information is read and processed in order to decide on the processing to be applied to the payload data (typically, whether or not to restitute a video stream on a television set).

This known technique is not suited to the present context, in which the signals are transmitted within a heterogeneous network (typically a home audiovisual network).

Indeed, if the above-mentioned known technique were to be transposed into the present context of a heterogeneous network, the parental control information would be inserted into the first packets (for example, IEEE 1394 type packets). Now, a modification of high-level data of this kind would be complex and costly to achieve.

Furthermore, all the destination terminals would have to be equipped with means for reading and processing this parental control information. This would appear to be hardly acceptable especially for reasons of cost.

Furthermore, this known technique does not provide for optimal management of a multicasting situation in which one and the same stream is given to several destination terminals (for example, to television sets located in different rooms).

Indeed, this technique gives no information on the way to synchronize several destination terminals successively on one and the same data stream.

SUMMARY OF THE INVENTION

The invention is aimed especially at overcoming these different drawbacks of the prior art.

More specifically, one of the goals of the present invention is to provide a method for the control of access to signals transmitted within a heterogeneous network, this method being a low-cost method that is simple to implement.

It is an additional goal of the invention to provide a method of this kind that does not necessitate any modification of high-level data.

It is another goal of the invention to provide a method of this kind that requires no modification of the destination terminals.

It is yet another goal of the invention to provide a method of this kind that can be applied in a multicasting situation as described here above.

It is another goal of the invention to provide a method of this kind enabling the least possible deviation from a Quality of Service (QoS) contract for the transmission of the data stream.

It is also a goal of the invention to provide a method of this kind that optimizes resources, and especially does not require the use of filler data (entailing no bandwidth losses).

These different goals, as well as others that will appear here below, are achieved according to the invention by means of a method for the insertion of information for the control of the broadcasting of a data stream in a heterogeneous network, the heterogeneous network including at least one entry sub-network conveying first packets and a basic network conveying second packets, the entry sub-network being connected to the basic network by means of an entry node forming the second packets from at least one sub-part of at least one first packet, wherein the entry node:
receives first packets from the entry sub-network
associates an access level with each first packet from a plurality of access levels, as a function of a predetermined policy of association;
forms each second packet by enclosing at least a first packet or part of a first packet into said second packet, the first packets or part of the first packets enclosed within the second packet being associated with a same access level;
for each second packet, inserts into a field of the second packet representing the broadcast control information, the same access level associated with the at least first packet or part of a first packet enclosed within the second packet; and transmits the second packets formed into the basic network.

The general principle of the invention therefore consists of the insertion of a piece of control information, namely an access level, in each of the second packets conveyed by the basic network.

As shall be explained in detail here below, this access level enables the destination node to decide:

either to process the second packets normally. In this case the destination node may form (de-encapsulate) and sent first packets on the destination sub-network to any destination terminal that is connected to it. In one alternative embodiment, if the destination node integrates the destination terminal, it may directly process the first packets formed;

or not process the second packet, and for example, swallow it.

Thus, the invention necessitates neither a modification of the first packet (high-level data) transmitted by the entry terminal nor any adaptation of the destination terminals.

Furthermore, the data may be broadcast, if necessary, on the entire heterogeneous network, since each destination node filters the data that it receives (in authorizing or not authorizing its transfer on its local bus). Consequently, certain destination nodes may accept the data (by normally processing the second packets), while others reject them (by swallowing the second packets).

In a preferred embodiment of the invention, at each change in access level, between a first packet associated with a previous access level and another first packet associated with a new access level, the entry node:

forms a synchronization second packet such that the start of the payload information of the synchronization second packet corresponds to the start of the payload information of the first packet associated with the new access level; and inserts a synchronization marker in the synchronization second packet.

Thus, the destination node is synchronized with the data stream that is transmitted from the entry terminal, the first packets of this stream being associated with the next access level.

In this way, the entry node secures the start of the first packet associated with the new access level to the start of the second packets, and inserts a synchronization marker into the second packet (which, for this reason, is called a "synchronization second packet"). As explained in detail here below, this marker enables the destination node to filter the second packets up to the reception of a synchronization second packet. Thus, it is ensured that the destination node starts forming (de-encapsulating) and sending first packets to the destination terminal which is connected to it (directly or not) only from the reception, by the destination node, of a synchronization second packet. It is therefore not necessary to initialize firstly the destination terminal, which is particularly useful when a second terminal wishes to view a stream that the first terminal is already viewing. Indeed, in this case, an initialization would lead to an interruption of the stream received by the first terminal.

It is important to note the non-systematic character of the synchronization according to the invention, which can be applied only to some of the first packets, namely those corresponding to a change in access level, more particularly an accepted higher access level. This results in limiting the number of securing operations to be performed and hence in limiting the impact of the synchronization on the quality of service of transmission of the data stream.

It will also be noted that the method according to the invention can be applied to the first destination terminal that gets synchronized with the stream as well as with any other destination terminal that subsequently gets synchronized with this same stream. In other words, the present invention can be applied both in the case of a stream transmitted in a unicast transmission (with a single destination terminal) and in the case of a multicast stream (with a plurality of destination terminals).

It will also be noted that other techniques of synchronization can be envisaged without departing from the framework of the present invention. In particular, but not exclusively, it can be planned, at each change in access level, to implement a classic technique of synchronization wherein, in the case of a unicast connection, first of all the destination terminal is initialized and then the entry terminal is initialized. However, this classic technique has several drawbacks as compared with the above-mentioned synchronization technique (based on the use of a synchronization marker in certain second packets). It relies on a relatively heavy protocol, since the destination terminal has to be initialized before the entry terminal. Furthermore, by virtue of its very principle, it does not enable the successive synchronization of several destination terminals on a same data stream.

Advantageously, the input node modifies the size of each second packet preceding one of the synchronization second packets, in such a way that no filler element is needed to complete said preceding second packet.

In other words, the modified size of the preceding second packet is smaller than the normal size (and the instance considered) of the second packets. Thus, no filler data is used (to reach the normal size of the second packets) and there are therefore no bandwidth losses.

Advantageously, the entry node modifies the size of the synchronization second packet, so that the sum of the modified size of the preceding second packet and the modified size of the synchronization second packet is substantially equal to the normal size of a second packet.

Thus, the preceding second packet and the synchronization second packet are two second packets that can be processed in a same isochronous processing cycle. In other words, two second packets are generated (instead of only one if there were no securing), but nevertheless the isochronous cycle is complied with and there is the least possible deviation from the quality of service contract on the transmission of the data stream.

Advantageously, the entry node manages a mechanism, put into effect at each change in access level, for obtaining a current distance in memory, between a stored position of a forthcoming start of a first packet and a current position of a read pointer used for the construction of the second packets.

Advantageously, the entry node performs the following steps:

the entry node obtains said current distance;

if the current distance is equal to zero, the entry node generates and sends a synchronization second packet for which the start of the payload information corresponds to the start of the payload information of a first packet associated with the new access level, this synchronization second packet comprising a synchronization marker;

if the current distance is smaller than the normal size of a second packet, the entry node generates and sends a truncated second packet, known as a preceding second packet, whose reduced size is equal to the current distance, and then generates and sends a synchronization second packet for which the start of the payload information corresponds to the start of the payload information of a first packet associated with the new access level, this synchronization second packet comprising a synchronization marker;

if the current distance is greater than or equal to the normal size of the second packet, the entry node sends a normal-sized second packet which is not a synchronization second packet.

Preferably, at each change in access level, the entry node also inserts an access level change marker into the synchronization second packet.

As explained in detail here below, this access levels change marker simplifies the processing, by the destination node, of the second packets that it receives.

Advantageously, the policy of association of an access level with each first packet is based upon restriction on the use of the data stream and the access level comprises use restriction information.

In a first particular embodiment of the invention, the policy of association of an access level with each first packet is based on the use of a plurality of time slots. The entry node: obtains the time slot, among said plurality of time slots, that includes the instant of processing, by the entry node, of the given first packet; associates one of the access levels with the first packet as a function of the time slot obtained.

In a second particular embodiment of the invention, the policy of associating an access level with each first packet is based on the use of a plurality of pieces of control information that can be contained in the first packets. The entry node: obtains at least one piece of control information, from among said plurality of pieces of control information, contained in a given first packet; associates one of the access levels with the given first packet as a function of said at least one piece of control information obtained.

The term "control information" is understood to mean especially, but not exclusively, a particular signal added by a broadcaster to the payload data. Typically, this particular signal represents a logo intended to be displayed in a particular region of the screen (for example, at the bottom right-hand position), to indicate a classification (for example, "restricted to persons 12 years of age and above") of an audiovisual stream (film, television broadcast, etc.).

In a third particular embodiment of the invention, the policy of associating an access level with each first packet is based on the use of said plurality of time slots and said plurality of pieces of control information. The entry node: obtains the time slot, among said plurality of time slots, that includes the instant of processing, by the entry node, of a given first packet; obtains at least one piece of control information, from among said plurality of pieces of control information, contained in a given first packet; associates one of the access levels with the given first packet as a function of the time slot obtained and said at least one piece of control information obtained.

In other words, this third embodiment is a combination of the above-mentioned first and second embodiments.

When the data stream is transmitted by an entry terminal, several situations on the entry node and the entry terminal can be envisaged in the context of the present invention:

the entry terminal is a digital type of terminal connected to the entry sub-network and directly generating the data stream in the form of first packets;

the entry terminal is an analog type terminal, connected to the entry sub-network by means of an independent adapter enabling the conversion, into first packets, of the data stream generated in the form of analog signals by the entry terminal;

the entry terminal is an analog type terminal directly connected to the entry node and the entry node integrates an adapter enabling the conversion, into first packets, of the data stream generated in the form of analog signals by the entry terminal;

the entry terminal is integrated into the entry node, which directly generates the data stream in the form of first packets.

In the four cases mentioned here above, it is always assumed that the entry node has to process first packets: these packets are generated by the entry terminal (first case) or its adapter (second case), or again by the entry node itself (third and fourth case). It will be noted that, in the third and fourth cases, the notion of an entry sub-network does not come into play since the entry terminal is integrated (fourth case) into the entry node or directly connected (third case) to the entry node.

The invention also relates to a method for the processing of information for the control of the broadcasting of a data stream in a heterogeneous network, the heterogeneous network including at least one destination sub-network conveying first packets and a basic network conveying second packets, the destination sub-network being connected to the basic network by means of a destination node. For each second packet received, the destination node:

(a) determines whether the second packet received is intended for the destination node or the destination sub-network;

(b) if the second packet is intended for the destination node or the destination sub-network, it obtains the access level contained in a field of the second packet representing the broadcast control information;

(c) determines whether the access level obtained is an access level accepted by the destination node;

(d) if the access level obtained is an accepted access level, it extracts the contents of the second packet and generates at least one first packet;

(e) processes or transfers the first packets formed to the destination sub-network.

In the context of the present invention, several techniques may be envisaged to determine the fact that the access level obtained is an access level accepted or not accepted by the destination node (step (c)). For example, and as described in detail here below with reference to the figures, each destination node can manage a register indicating, for each of the possible access levels, whether or not it is accepted by this destination node. According to another example, the possible access levels possess distinct digital values and each access node stores a threshold value with which the value of each access level obtained is compared (for example, only the access levels having a value greater than or equal to the threshold value are accepted by the destination nodes).

Preferably, if the access level obtained is not an accepted access level, the destination node swallows the second packet received, without forming any first packets.

According to an advantageous characteristic, after having performed the step (a), the destination node tries to detect an access level change marker in the second packet. If an access level change marker is detected, the destination node: performs the steps (b) and (c); stores an "accepted" or "not accepted" state of a first flag pertaining to the access level obtained; performs the steps (d) and (e) if the state of the first stored flag is the "accepted" state. If an access level change marker is not detected, the destination node: reads the state of the first flag stored, without performing the steps (b) and (c); performs the steps (d) and (e) if the state of the first stored flag is "accepted".

Advantageously, after having performed the step (a), the destination node tries to detect a synchronization marker in the second packet. If a synchronization marker is detected, the destination node considers the second packet to be a synchronization second packet, stores a "true" state of a second flag pertaining to the reception of a synchronization second packet (the state of the second flag stored by default being "false") and performs the next steps for processing the second packet. If a synchronization marker is not detected, the destination node reads the state of the second stored flag and performs the next steps for processing the second packet if the state of the second stored flag is "true".

Preferably, if the state of the second stored flag is "false", the destination node swallows the second packet received without performing the following steps of the processing of the second packet.

Advantageously, the access level comprises information for the restriction on the use of the date stream by the destination node.

Several situations pertaining to the destination node and to the destination terminal may be envisaged in the context of the present invention:

- the data stream is intended at least for one digital type of destination terminal connected to the destination sub-network and directly receiving the first packets generated by the destination node and representing the data stream;
- the data stream is intended for at least one analog type destination terminal, connected to the destination sub-network by means of an independent adapter enabling the conversion, into analog signals, of the first packets generated by the destination node and representing the data stream;
- the data stream is intended for at least one analog type destination terminal directly connected to the destination node, and the destination node integrates an adapter enabling the conversion, into analog signals, of the first packets generated by the destination node and representing the data stream;
- the data stream is intended for the destination node, and the destination node directly processes the data stream in the form of first packets.

In the four cases mentioned here above, it is always assumed that the destination node has to generate first packets which are then processed directly (first case) or processed, after conversion by the adapter (second case), by the input terminal or again by the destination node itself (third and fourth cases). It will be noted that, in the third and fourth cases, the notion of a destination sub-network does not come into play since the destination terminal is integrated (fourth case) or directly connected (third case) to the destination node.

Advantageously, the heterogeneous network is a home audiovisual network.

Advantageously, the first packets are IEEE 1394 type packets.

Advantageously, the base network is a switched network.

The invention also relates to an entry node in a basic network, comprising information insertion means for the control, by a destination node, of the broadcasting of a data stream transmitted from an entry terminal in a heterogeneous network. These means for the insertion of control information comprise:

- means for the association of an access level with each first packet from among a plurality of access levels, as a function of a predetermined policy of association;
- means for the formation of each second packet so that the first packet or packets that it comprises are associated with a same access level, and means for the insertion of said same access level in an "access level" field of said second packet.

The invention also relates to a destination node of a basic network, comprising means for the processing of information to control the broadcasting of the data stream transmitted from an entry terminal in a heterogeneous network. These means for the processing of control information comprise means that make it possible, for each second packet received, to:

(a) determine whether the second packet received is intended for the destination node or the destination sub-network;
(b) if the second packet is intended for the destination node or the destination sub-network, to obtain the access level contained in an "access level" field of the second packet;
(c) determine whether the access level obtained is an access level accepted by the destination node;
(d) if the access level obtained is an accepted access level, to form one or more first packets from the second packet received;
(e) process or transfer the first packets formed to the destination sub-network.

BRIEF DESCRIPTION OF THE DRAWINGS

Other features and advantages of the invention should appear from the following description of a preferred embodiment of the invention, given by way of non restrictive illustration, and from the appended drawings, of which:

FIG. 4A shows a particular embodiment of the contents analysis module appearing in FIG. 3;

FIG. 4B illustrates the state machine of the contents analysis module illustrated in FIG. 3;

MORE DETAILED DESCRIPTION

Figure 1:
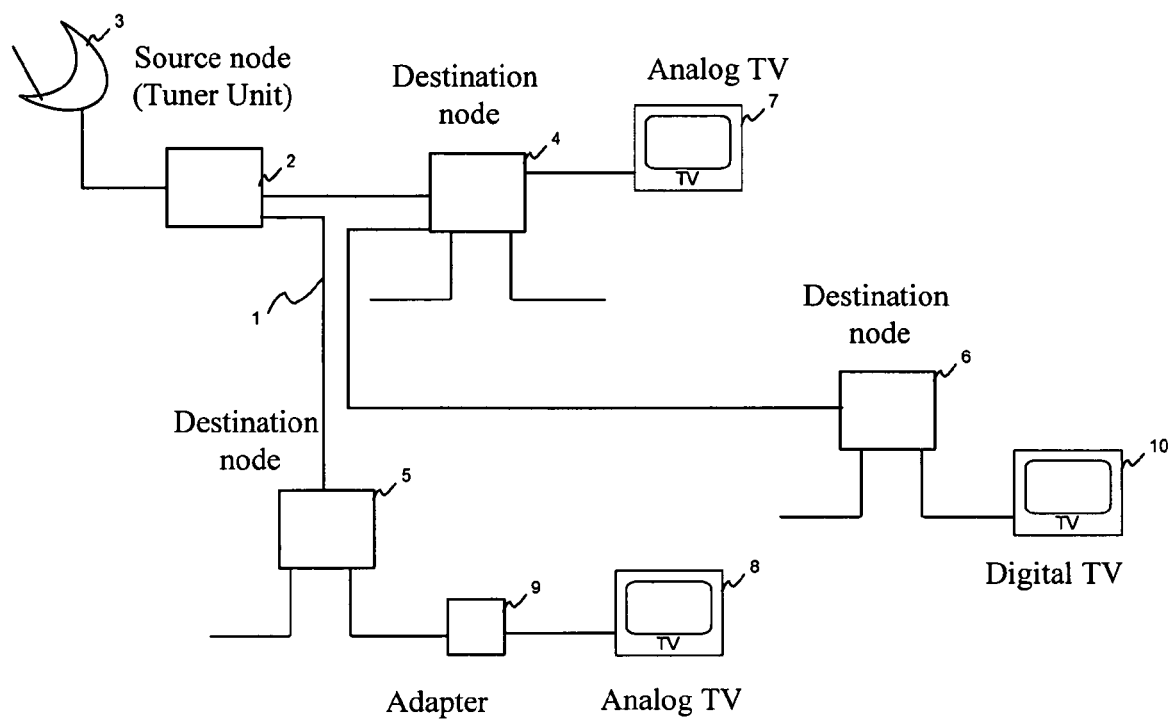
FIG. 1 is a block diagram of an example of a home audiovisual network, of the digital bus heterogeneous network type, in which it is possible to implement the synchronization method according to the invention.

Referring to FIG. 1, we shall now present an example of a home audiovisual network in which the method of access level management according to the invention can be implemented.

This home audiovisual network is a heterogeneous network of IEEE 1394 type digital buses, whose basic network 1 is a switched network comprising links connected to each other by links (for example, IEEE 1355 type or SWX-UTP5 type links).

Each node 2, 4, 5 or 6 is equipped with:
- a first IEEE 1355 type interface (input/output) interface used to connect this node to other nodes;
- a second IEEE 1394 type (input/output) interface used to connect this node to a digital bus to which it is possible to connect digital terminals or else analog terminals, the latter being connected through adapters (analog/digital converters);
- a third analog type interface (output only) used to connect this node to an analog terminal;

In the example of FIG. 1, the home audiovisual network comprises:
- a source node (Tuner Unit) 2 including a satellite television receiver whose antenna is referenced 3. This source node 2 is connected to the nodes referenced 4 and 5, through IEEE 1355 type links. Solely with a view to simplification, no analog terminal is shown connected to its analog interface and no IEEE 1394 type bus is shown connected to its corresponding interface;
- a node referenced 4 connected to the nodes referenced 2 and 6, through IEEE 1355 type links. An analog television set 7 is connected to its analog interface. Solely with a view to simplification, no IEEE 1394 type bus is shown connected to its corresponding interface;
- a node referenced 5 connected to the node referenced 2, through an IEEE 1355 type link. An IEEE 1394 type bus is connected to its corresponding interface and an analog television set 8 is connected to this bus through an adapter 9. Solely with a view to simplification, no analog terminal is shown connected to its analog interface.
- a node referenced 6 connected to a node referenced 4, through an IEEE 1355 type link. An IEEE 1394 type bus is connected to its corresponding interface and a digital television set 10 is connected to this bus. Solely with a view to simplification, no analog terminal is shown connected to its analog interface.

By way of an illustrative example, it is assumed hereinafter in the description that the data stream (for example a satellite television program) received by the source node (Tuner Unit) 2 is converted into 1394 packets (first packets), and then broadcast to all the nodes of the network in 1355 packets (second packets) in which the first packets are encapsulated.

In the source node 2, a contents analysis module (described in detail here below) analyses the streams received (and converted into first packets), and inserts information (access level, synchronization marker, access level change marker) in the second packets, so that each destination node decides independently whether or not it can itself process or transfer the received stream to its IEEE 1394 bus.

In the example described here below, the contents analyzer uses a clock (or timer). The main user of the home audiovisual network must define a set of access levels (for example n levels) associated with n time slots without overlapping resulting from the subdivision of a day or a week. In each node, it must furthermore store this set of access levels and the associated time slots, by using all appropriate means (for example by means of an infrared remote-control pack). For example, the access level "1" is associated with the 7 a.m. to 9 a.m. time slot, the level "2" to the 9 a.m. to 5 p.m time slot, the level "3" to the 5 p.m. to 9 p.m. time slot etc. Thus, when the data stream received by the source node is sent on the network, an access level is inserted in each second packet as a function of the current time. In each destination node, the main user should have entered the access level or levels accepted by this destination node. In the previous example, the node located in the children's room will accept only the access level "3" if the parents do not wish their children to watch television outside the 5 p.m. to 9 p.m. time slot.

Figure 2:
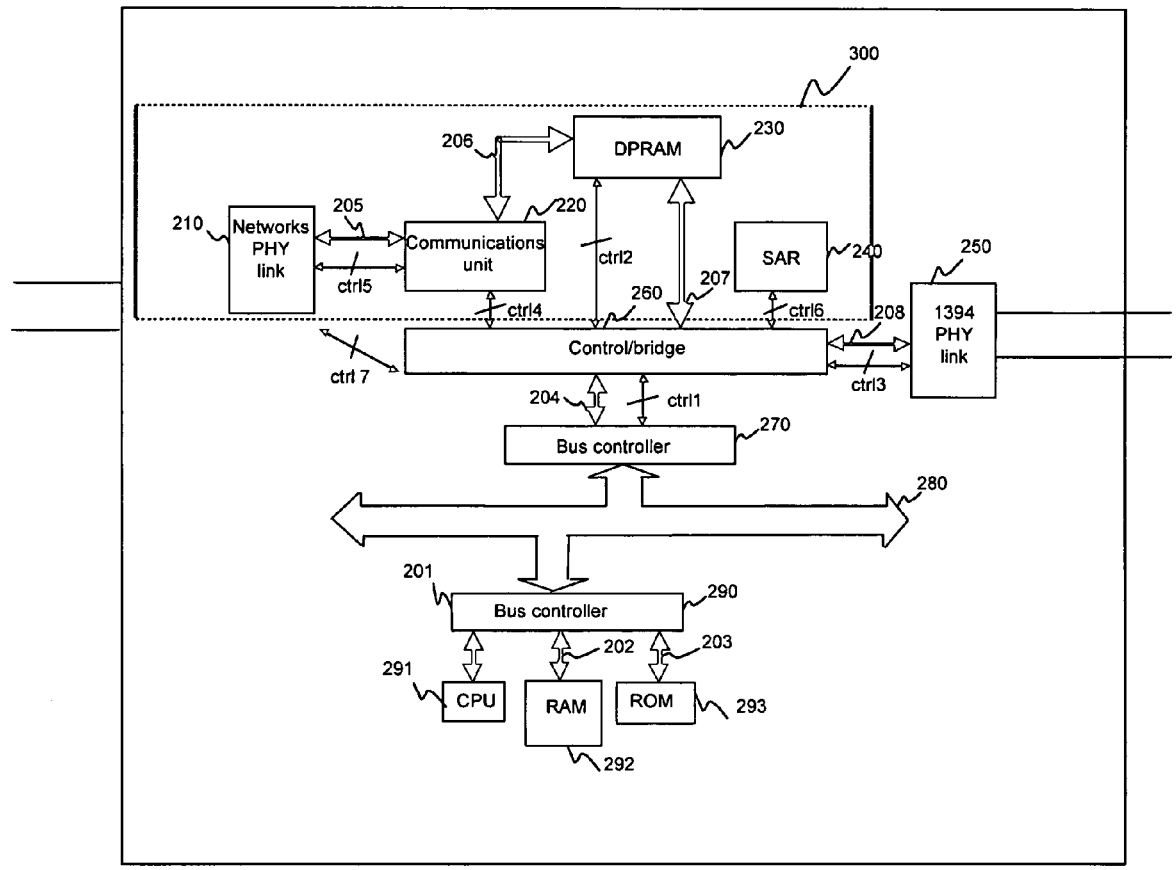
FIG. 2 is a block diagram of an example of a node of the switched network contained in the home audiovisual network of FIG. 1.

FIG. 2 illustrates the structure of a node (also called a heterogeneous bridge) referenced 2, 4, 5 or 6 in FIG. 1.

A node of this kind has two communications interfaces: a first interface 250 with the IEEE 1394 bus and a second interface 210 with the switched network 1. The latter interface comprises for example a C113 type component manufactured by 4Links Ltd (registered mark), if the switched network is based on the "IEEE 1355-1995: Standard for Heterogeneous Interconnect (HIC)".

The switch (or switch unit) 220 is used to transfer data from a first port to a second port of the interface of the switched network, receive data from an interface port of the switched network to the DPRAM 230 and transmit data from the DPRAM 230 to at least one port of the interface of the switched network (in this descending order of priority). The working of a switch 220 of this kind is described especially in the French Patent No. 2 820 921 published on Aug. 16, 2002 and filed by the present applicant. Since such an operation is not part of the object of the present invention, it shall not be described in greater detail in this document.

The DPRAM 230 is laid out in a set of FIFOs, used to transfer data from the IEEE 1394 interface 250 to the interface of the switched network 210 and vice versa. The instantiation of these FIFOs is carried out by the central processing unit or CPU 291.

The SAR module 240 is used for the segmentation and reassembly of data coming from and addressed to the interface of the network 210. Thus, the IEEE 1394 type isochronous packets may be segmented with a view to their transmission on the switched network 1. The transfer of asynchronous packets does not form part of the present invention and shall therefore not be described. Furthermore, the SAR 240 plays a planning or scheduling role for the transmission of data on the network, in order to comply with the time constraints dictated by isochronous transfers.

The configuration of all the modules is done by the central processing unit or CPU 291 through the bus interface 270. The data and control exchanges between the Control/Bridge module 260 and the CPU 991 are done through the data interface 204 and the signals ctrl1, the bus interface 270 and the host bus 280.

The node furthermore comprises a microcontroller (CPU) 291, a ROM type permanent storage means 293 and a RAM type temporary storage means 292.

The bridge/control module 260 comprises a first stream control table (also called a stream routing table) as specified in the "Standard for High Performance Serial Bus Bridges" for communications on the IEEE 1394 interface 250. The bridge/control module 260, in correspondence with this first table, also maintains a second stream control table for communications with the switched network. Furthermore, the bridge/control module 260 is in charge of modifying the fields of the IEEE 1394 packets in order to transmit them on the IEEE 1394 interface (250), and especially the fields pertaining to the bit rate, the channel taken by the packets, the time-related information (CIPs) and the information intended for the IEEE 1394 interface (250) pertaining to transmission speed. The bridge/control module 260 manages the DPRAM 230, by means of the control signals ctrl2. It is in charge of the recording and reading of the data in the FIFOs of the DPRAM 230.

Optionally, the node also comprises analog interface means (not shown) used to connect this node to an analog terminal, as well as means forming an integrated adapter used for the conversion, into first packets, of a data stream generated in the form of analog signals by the analog terminal or conversely for the conversion, into analog signals, of the first packets generated by the node and representing a data stream intended for the analog terminal.

It may be recalled that, in general, four situations can be distinguished on the entry node side (and destination node side respectively):

- the entry terminal (and destination terminal respectively) is a digital type of terminal, connected to the entry node (and destination node respectively) through a digital bus;
- the entry terminal (and destination terminal respectively) is an analog terminal, connected to an independent analog/digital adapter, which is itself connected to the entry node (and destination node respectively), through a digital bus;
- the entry terminal (and destination terminal respectively) is an analog terminal directly connected to the entry node (and destination node respectively), this node integrating an analog/digital adapter;
- the entry terminal (and destination terminal respectively) is integrated into the entry node (and destination node respectively).

Figure 3:
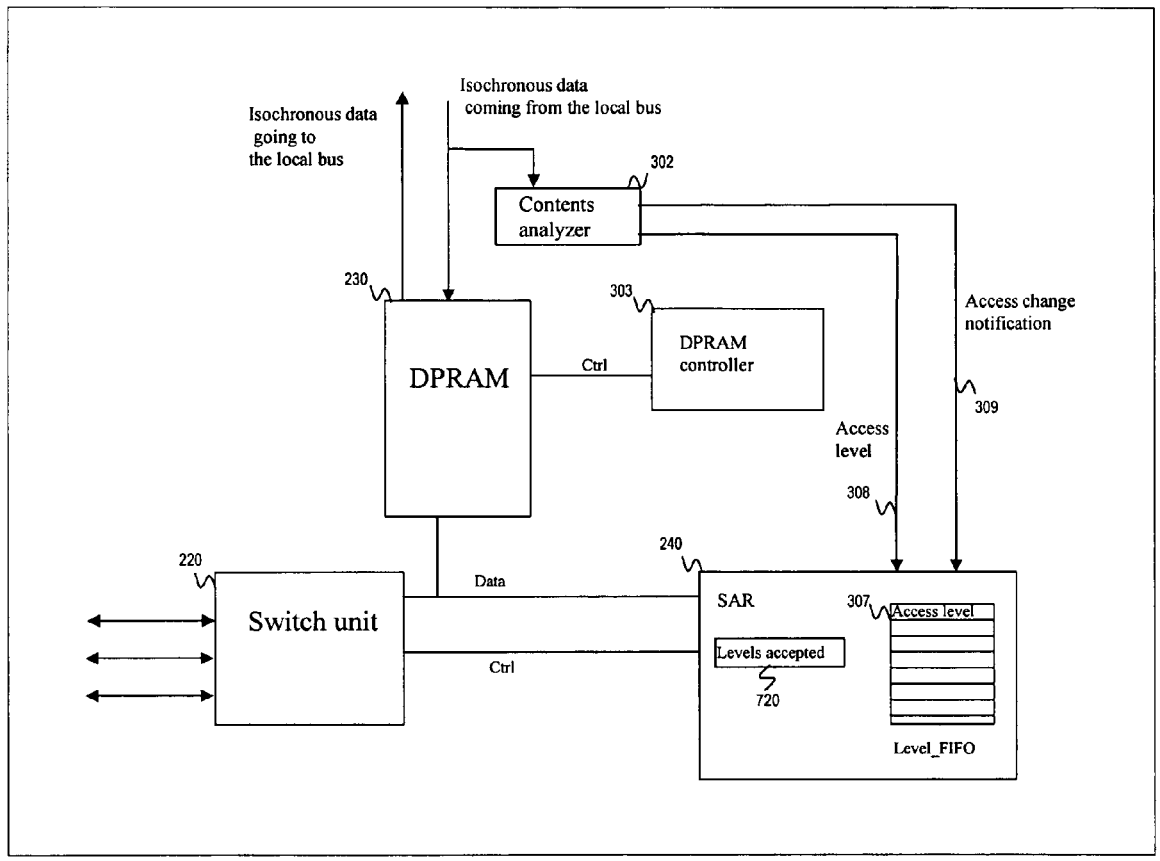
FIG. 3 is a block diagram giving a more detailed view of a part of the block diagram of FIG. 2, so as to give an overall view of the means specific to the present invention.

Referring now to FIG. 3 (which also takes up a part of the block diagram of FIG. 2 in greater detail), we present a set of means to implement the present invention. It will be noted that, for the sake of simplification, the contents analysis module 302 and the DPRAM controller 303 are not shown in FIG. 2, although they belong to this set of means referenced 300 in FIG. 2.

In sending mode, (i.e., in the source node 2, in the above-mentioned example) the isochronous data (first packets) coming from the 1394 bus interface are analyzed by the contents analysis module 302 and stored in the DPRAM 230. This DPRAM is managed by the DPRAM controller 303, which manages the read and write pointers. The pieces of data are then segmented by the SAR module 240 in order to meet constraints and comply with the data format of the switched network 1. After segmentation, they are transmitted to the switch unit 220, which sends them on the network 1. The first packets (1394) containing the isochronous data are encapsulated in second packets (1355), as described here below with reference to FIG. 8.

When the contents analysis module 302 detects a change in access level in the data stream (change in time slot in the above-mentioned example), it activates the SAR module 240 and gives it the new access level, as described in detail here below with reference to FIGS. 4A and 4B. Following this activation, the SAR module 240 obtains the new access level and performs actions enabling efficient synchronization on the reception side.

As described in detail here below with reference to FIGS. 5, 6 and 7, these actions consist for example of a particular use of the synchronization mechanization described in the French patent application No. 02 14989 filed by the present applicant and not yet published on the date of filing of the present application. According to the general principle of this mechanism of synchronization, therefore, the start of certain first packets are matched with the start of a second packet and a synchronization marker is inserted in this second packet (which, for this reason, is called a "synchronization second packet"). This marker enables the destination node to filter the second packets up to the reception of a synchronization second packet. Thus, it is seen to it that the destination node starts forming (de-encapsulating) and sending first packets to the destination terminal that is (directly or not directly) connected to it only from the reception, by the destination node, of a destination second packet. This synchronization has a non-systematic character because it can be applied solely to certain of the first packets (and not to all of them). In the present context, this synchronization mechanism is used whenever the entry node detects a change of access level in the data stream (first packets) to be transmitted. Thus, it is ensured that the start of the first packet which generated the change in access level is matched with the start of a second packet which furthermore comprises a synchronization marker.

Referring now to FIGS. 4A and 4B, we present a particular embodiment of the contents analysis module referenced 302 in FIG. 3.

FIG. 4A shows the contents analysis module 302 itself, comprising chiefly:

- a clock or timer 501 generating output signals (pulses) according to a predetermined rate;
- a set of registers 502 containing the information needed for the generation of the access level values. Each possible access level is, for example, associated with a time slot defined by its starting and ending times. However, it is clear that other criteria of association may be defined, based for example on whether or not certain particular pieces of information (called control information) are present in the first packets. The registers may be pre-filled or filled by the main user by means of any appropriate means (screen, keyboard, etc.);
- a state machine 503 (described in detail here below with reference to FIG. 4B).

The contents analysis module 302 receives the isochronous data stream coming from the local 1394 bus, and generates an access level 308 and a Boolean flag ("access_change notification") 309 taking the value "1" if a change in access level has been detected. The access level 308 is generated only when the Boolean flag 309 takes the value "1".

FIG. 4B illustrates the state machine 503 of the contents analysis module 302. In the state referenced 510, at each clock pulse, an iteration variable I is initialized at 1. This iteration variable I is used to scan the table of time slots contained in the set of registers 502. Then, in the state referenced 511, a test is made to compare the value of the clock with the value stored in the table of time slots corresponding to the starting time of the access level i.

If the result of the test 511 is "true" (i.e. if these two values are identical) the operation passes to the state referenced 522 in which the data stream is scrutinized until a header of the first packet (1394 packet) is found. When a header is found, the operation passes to the state referenced 512, in which the access level 308 takes the <<level I>> value and the <<access change notification>> 309 takes the value <<1>>. The state loop referenced 522 makes it possible to position the <<access notification change>> flag 309 at "1" while the 1394 header is being written in the DPRAM, enabling the state machine described in FIG. 5 to store the 1394 header offset by reading the write pointer in the DPRAM. The operation then passes to the state referenced 513, in which the next clock pulse is awaited.

If the result of the test 511 is "false", the operation passes to the state referenced 514 in which another test is made to ascertain that the clock has reached the time corresponding to the end of the time slot corresponding to the access level i.

If the result of the test 514 is "true", the iteration variable I is reinitialized at 1, in the state referenced 515, and the operation passes to the state referenced 516 in which a new test is made to ascertain that the value of the clock belongs to another time slot.

If the result of the test 516 is "true", the operation passes to the state referenced 522, which has already been discussed here above. If the result of the test 516 is "false", the iteration variable I is incremented in the state referenced 517, and the operation passes to the state referenced 518 in which another test is performed to ascertain that the end of the table of time slots 502 has been reached. If this is the case (i.e. if the result of the test 518 is "false"), the operation passes to the state referenced 523 in which the data stream is scrutinized until a header of a first packet (1394 packet) is found. When a header is found, the operation passes to the state referenced 519, in which the access level 308 takes the value "0" (default access level) and the "Notification of access change" flag 309 takes the value "1". The operation then passes to the state referenced 513, in which the next clock pulse is awaited. If the result of the test 518 is "true", the state test referenced 516 is performed with the iteration variable I incremented.

If the result of the test 514 is "false", the iteration variable I is incremented in the state referenced 520, and the operation passes to the state referenced 521 in which another test is performed to find out if the end of the table of time slots 502 has been reached. If this is the case (i.e., if the result of the test 521 is "false"), the operation passes to the step referenced 513, in which the next clock pulse is awaited. If the result of the test 521 is "true", the test referenced 511 is performed with the iteration variable I incremented.

Figure 5:
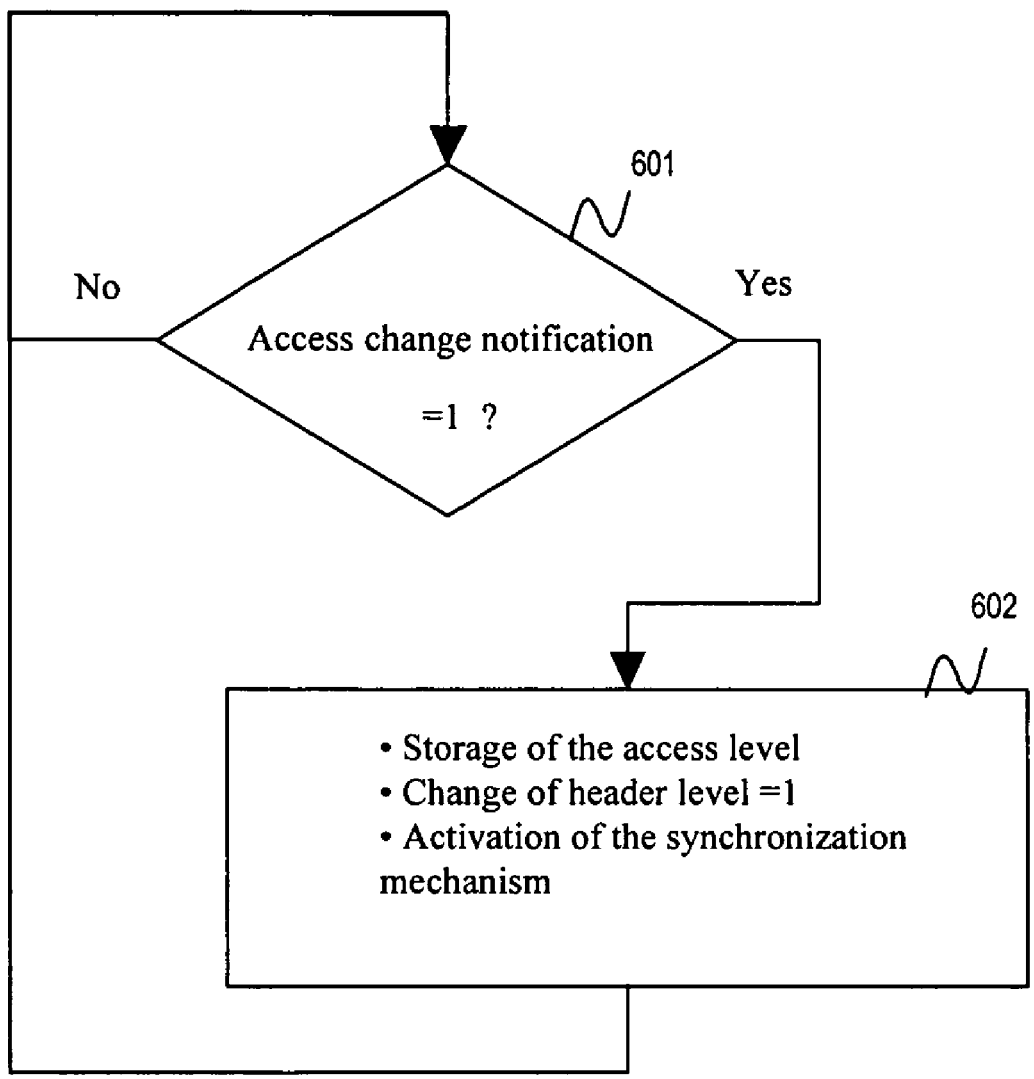
FIG. 5 is a flow chart of a particular embodiment of the method of management of access level according to the invention, for the part implemented by the SAR module of the entry node.

Referring to the flow chart of FIG. 5, we shall now present a particular embodiment of the method of access level management according to the invention, for the part implemented by the SAR module 240 of the input node.

In the state referenced 601, there is a wait for the "change of access notification" flag 309 to take the value "1" (see states referenced 512 and 519 in FIG. 4B). When this is the case, the operation passes to the state referenced 602 in which the corresponding access level is stored in the access level FIFO memory (referenced 307 in FIG. 3). Furthermore, a "change of access level in header" flag is positioned (in taking the value "1"). Finally, a synchronization mechanism is activated. As described in detail here below, this mechanism is designed to enable a (re-)synchronization corresponding to the start of the validity of the new access level. The (1355) synchronization second packet thus generated, which carries the synchronization marker, is the first packet conveying the new access level.

Figure 6:
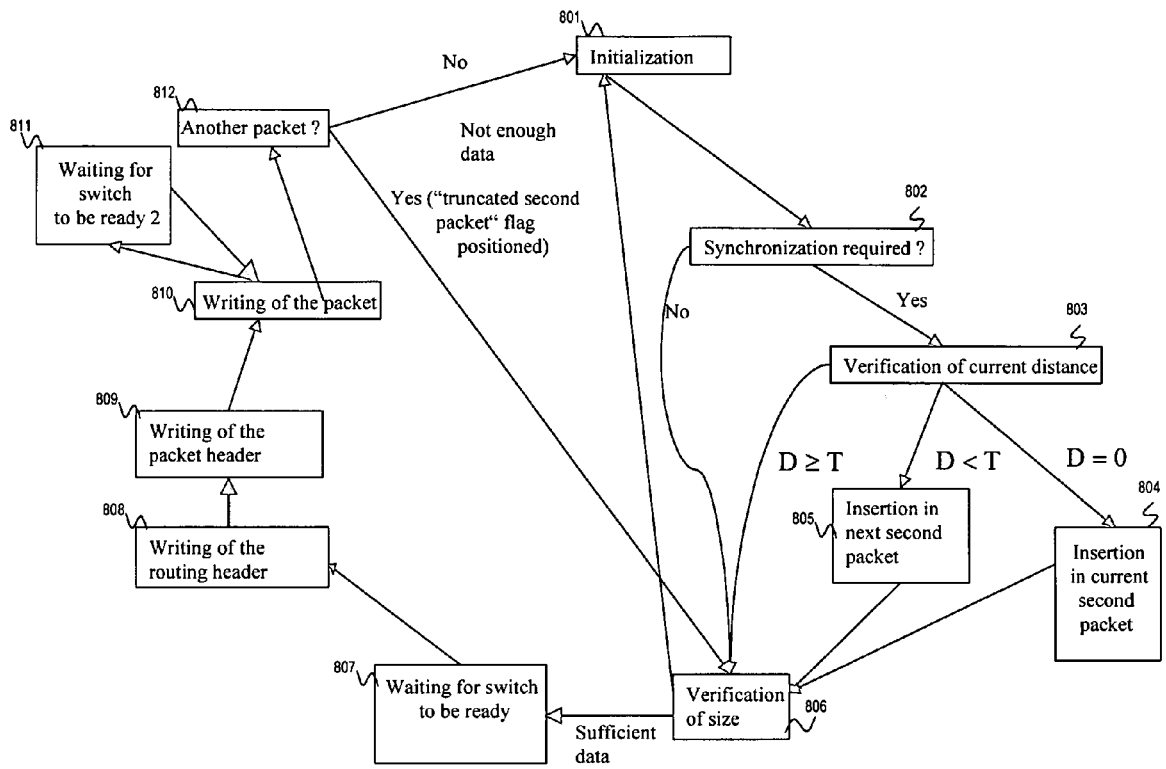
FIG. 6 is a flow chart of a mechanism of synchronization also implemented by the SAR module of the entry node, and activated during one of the steps of the flow chart of FIG. 5 (at each change in access level)

Referring to the flow chart of FIG. 6, we shall now present a particular embodiment of the mechanism of synchronization implemented by the SAR module 109 of the entry node and activated during the step referenced 602 in the flow chart of FIG. 5.

In the "initialization" state (referenced 801), the SAR module waits for an indication that a second packet has been sent. This indication is given by a scheduling engine. It is assumed that this indication has already been given.

In the "synchronization required?" state (referenced 802), the SAR module decides if it is appropriate (positive decision) or not (negative decision) to perform a synchronization step, namely a matching with the starting boundary of a first packet.

In the framework of the present invention, the SAR module takes a positive decision if the step referenced 602 in the flow chart of FIG. 5 has been performed, since this step includes especially an action of activating the synchronization mechanism.

For other situations in which this synchronization mechanism is activated, reference may be made to the contents (text and drawings) of the French patent application No. 02 14989 by the present applicant (not yet published on the date of filing of the present application). For example, the SAR module may also take a positive decision (activation) if the decision-making instant belongs to a set of predetermined instants given, for example, by a clock register included in the SAR module (first condition) or again if the decision-making instant follows the reception, by the entry node, of a synchronization request sent out by one of the destination terminals (second condition).

If the SAR module decides that it must perform a synchronization step (in case of a positive decision) it goes into the "checking of current distance D" state (referenced 803); if not (in the case of a negative decision) it goes into the "checking of size" state (referenced 806).

In the "checking of current distance" state (referenced 803), the SAR module asks for this distance information D from the control module 260 of the DPRAM 230, also included in the entry node. If the distance D is equal to zero, the SAR module goes into the "Insertion in current second packet" state (referenced 804). If the distance D is smaller than the normal size T of a second packet (at the instant considered), the SAR module goes into the "Insertion in the next current second packet" state (referenced 805). If the distance D is greater than or equal to the normal size T of a second packet (at the instant considered), the SAR module goes into the "checking of size" state (referenced 806), without carrying out any synchronization.

Figure 7:
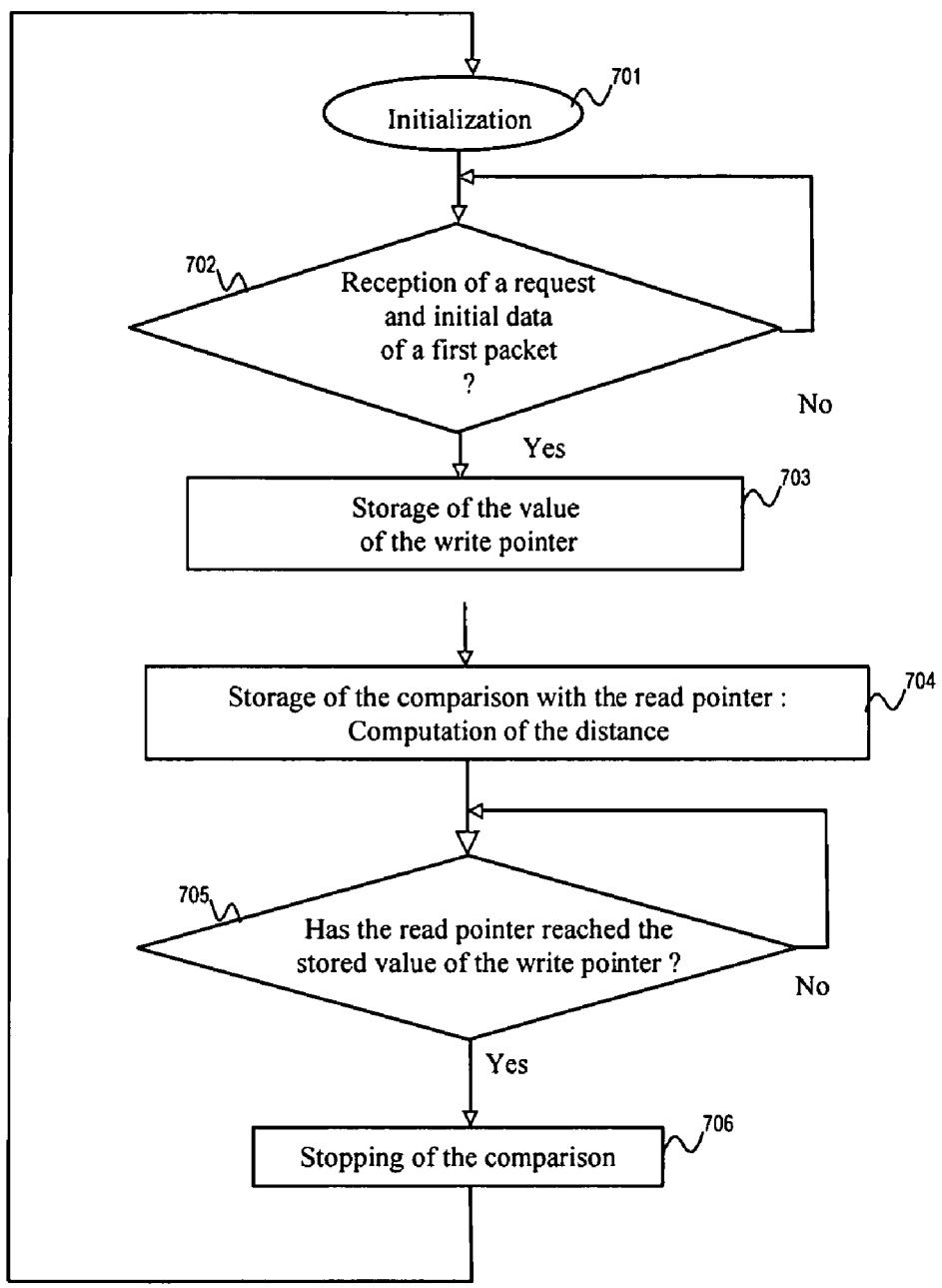
FIG. 7 is a flow chart of a mechanism for obtaining a current distance in memory, this mechanism being executed by the DPRAM controller of the entry node, upon a request made by the SAR module of this same entry node during one of the steps of the flow chart of FIG. 6.

Referring now to FIG. 7, we shall now present the mechanism for obtaining the current distance in memory. This mechanism is executed, within the entry node, by the control module 260 of the DPRAM 230, hereinafter called the "controller" 260.

It may be recalled that the DPRAM 230 comprises several memory zones (or "buffers") storing first packets (of the IEEE 1394 type) coming from the IEEE 1394 interfacing means (referenced 250 in FIG. 2). These first packets must be encapsulated by the SAR module in second (IEEE 1355 type) packets sent, through the switch unit 220, to the IEEE 1355 interfacing means (referenced 210 in FIG. 2).

After an initialization step (referenced 701), the controller 260 (in the step referenced 702) determines whether it has received a request and first data, marked as a starting boundary of a first packet, from the IEEE 1394 interfacing means (250). If the answer is negative, it reiterates the step referenced 702. If the answer is positive, then (in the step referenced 703), it memorizes the value of the write pointer, which corresponds to the memorized position of a following start of a first packet. Then (in the step referenced 704), it authorizes the comparison of this memorized value of the write pointer with the current value of the read pointer used for the building of the second packets, so as to obtain the current distance, at the instant considered. Thus, at each request for the reading of a memory zone or buffer of the DPRAM 230, the current distance to the next start of the first packet is computed.

This computation can be expressed by the following formula:

Distance=(memorized value of the write pointer)–(current value of the read pointer) modulo (size of a buffer of the DPRAM)

Then, the controller 260 (in a step referenced 705) ascertains that the read pointer has reached the stored value of the read pointer. If the answer is positive, it stops the comparison (step referenced 706) and returns to the initial step (referenced 701). If not, it returns to the step referenced 705.

We shall now continue with the description of the flow chart of FIG. 6.

In the "Insertion in the current second packet" state (referenced 804), the SAR module positions a flag called a "synchro insertion" flag whose role is specified here below (see state referenced 809).

In the "Insertion in the following second packet" state (referenced 805), the SAR module modifies the normal size of the second packets so as to obtain a first modified size equal to the current distance. Furthermore, in a register named "remaining size", it stores the result of the difference between the normal size and the current distance. Finally, it positions a flag called a "truncated second packet", whose role is specified here below (see state referenced 812).

In the "checking of size" state (referenced 806), the SAR module asks the controller 260 for the size of the data available in the DPRAM 230. If there are sufficient data in the DPRAM to send the second packet, then the SAR module goes into the "waiting for switch to be ready" state (referenced 807). If not it returns to the "initialization" state (referenced 801).

In the "waiting for switch to be ready" state (referenced 807), the SAR module waits until the FIFO memory of the switch 108 becomes empty. Then it goes into the "writing of the routing header" state (referenced 808).

In the "writing of the routing header" state (referenced 808), the SAR module writes the routing header to the FIFO memory of the switch 220. Then it goes into the "writing of the packet header" state (referenced 809).

In the "writing of the packet header" state (referenced 809), the SAR module:

inserts a synchronization marker into the header of the second packet, if the "synchro insertion" flag has been positioned beforehand (see states 804 and 812). This flag is then put back in its inactive value.

inserts the previously stored access level (see the step referenced 602 of the flow chart of FIG. 5) into an "access level" field contained in the header of the second packet;

inserts an access level change marker into the header of the second packet if the "access level change in header" flag has been positioned as a preliminary (see step referenced 602 of the flow chart of FIG. 5).

This flag is then restored to its inactive value.

Then the SAR module goes into the "writing of the packet" state (referenced 810) in which it transfers data from the DPRAM 230 to the FIFO memory of the switch unit 220. If the FIFO memory gets full, it goes into the "waiting for switch to be ready 2" state (referenced 811) until it becomes empty again. When all the data corresponding to the size of the second packet have been transferred, the SAR module goes into the "other packet?" state (referenced 812).

In the "other packet ?" state (referenced 812), if the "truncated second packet" flag has been positioned beforehand, the SAR module:

again modifies the size of the second packet, so as to obtain a modified second size equal to the previously stored value (see the state referenced 805) in the register named "remaining size";

positions the flag named "synchro insertion";

goes back into the "checking of size" state (referenced 806), to send a second (synchronization) packet.

It will be seen that the sum of the size (modified second size) of the synchronization second packet and the size (modified first size) of the preceding second packet is equal to the normal size of the second packet, at the instant considered.

This enables the utmost compliance with the QoS contract for the transmission of the data stream. Indeed, these two second packets (namely the synchronization second packet and preceding second packet respectively) may be processed during a same isochronous cycle.

If the "truncated second packet" has not been positioned beforehand, the SAR module goes back into the "initialization" state (referenced 801).

Figure 8:
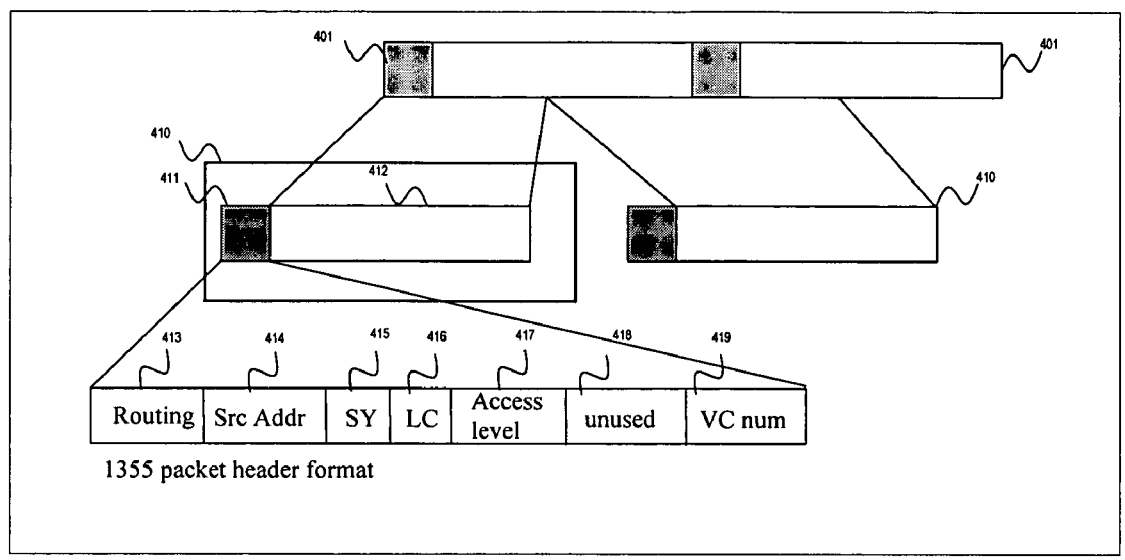
FIG. 8 describes an example of the structure of second packets, conveyed on the switched network included in the home audiovisual network of FIG. 1, and comprising fields specific to the method of access level management according to the invention.

FIG. 8 describes an example of the structure of a second packet 410, carried on the switched network 1 contained in the home audiovisual network of FIG. 1.

A packet structure of this kind comprises a header 411 and a payload part 412. As illustrated in FIG. 8, first packets (1394 packets) 401 are encapsulated in the payload parts 412 of the second packets 410. The size of the second packets depends on the parameters of the switched network 1.

In a classic way, the header 411 comprises, for example, a routing field 413, a virtual channel number field 419, a source address field 414 and an unused field 418.

According to the invention, the header 411 furthermore comprises the following fields (filled during the "packet header writing" state referenced 809 in FIG. 6):

a synchronization field 415, encoded for example on one bit and named "sy". It is in this field that the SAR module inserts a synchronization marker, if the "synchro insertion" flag has been positioned beforehand;

an access level change 416, encoded for example on a bit and named "LC" ("level change"). It is in this field that the SAR module inserts an access level change marker if the "change of access level in the header" has been positioned beforehand;

an access level field 417 in which the SAR module inserts the access level stored beforehand.

At reception (i.e. in each of the destination nodes referenced 4, 5 and 6 in the above-mentioned example), the data stream coming from the switched network 1, conveyed in the form of second packets, is received and analyzed by the switch unit 220. Depending on the access level extracted from this data stream by the switch unit 220, the data are either abandoned ("swallowed") or stored in the DPRAM 230 before being processed by the destination node itself or else transferred to its local 1394 bus.

Thus, when the received second packets are swallowed, and when a new access level authorized for the concerned destination node is detected, the destination node stores, in its DPRAM, the payload part of the second (synchronization) part whose header comprises the synchronization marker and the access level change marker. Then this payload part is processed by the destination node itself or else transferred to its local 1394 bus. This is possible because the payload part of the second synchronization part starts (is matched) with a first packet header, owing to the processing done on the sending side, described in detail here above, with reference to FIGS. 4A, 4B, 5, 6 and 7.

Figure 9:
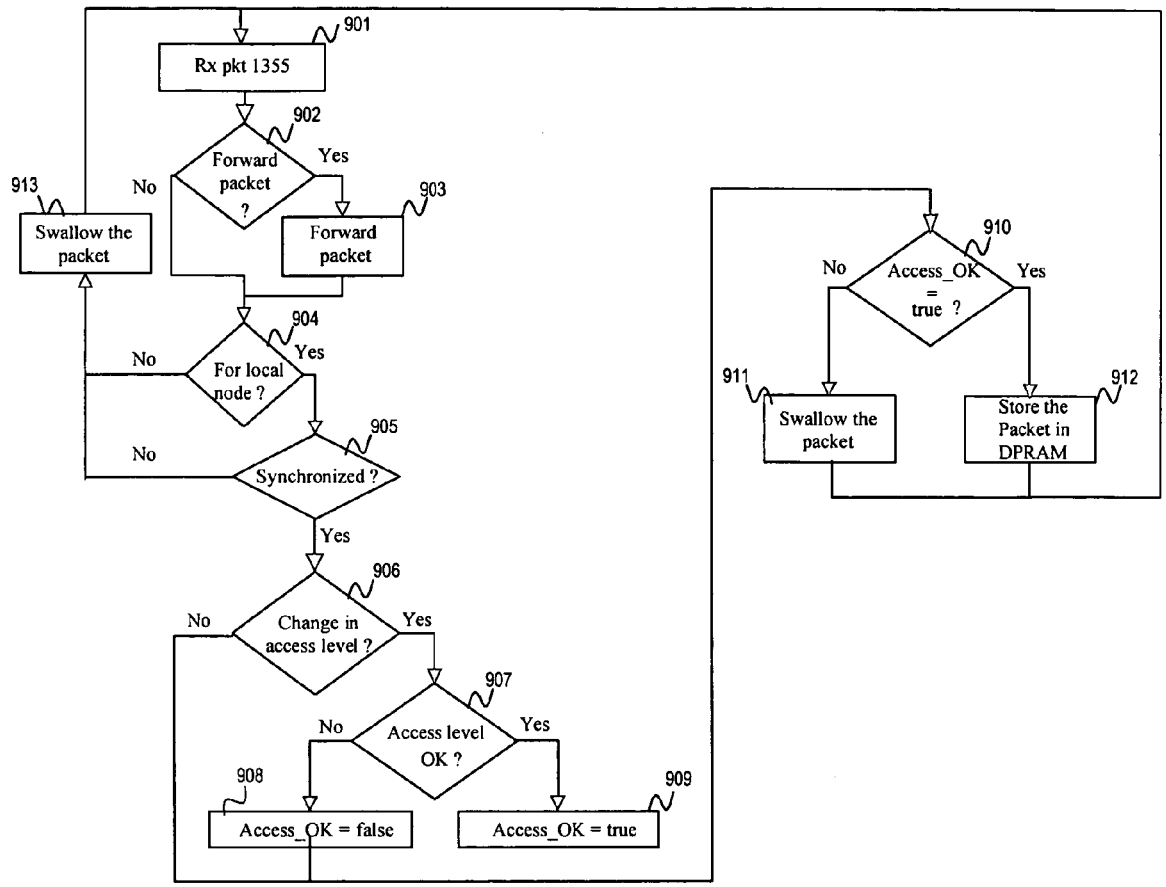
FIG. 9 is a flow chart of a particular embodiment of the method of management of access level according to the invention, including the mechanism of synchronization, for the part implemented by the SAR module of the destination node.

Referring now to the flow chart of FIG. 9, a description is given of a special embodiment of the method for the management of access levels according to the invention, for the part implemented by the SAR module 240 of a destination node.

In the state referenced 901, the SAR module receives a second packet. In the state referenced 902, it analyzes its header to ascertain that the second packet must be retransmitted to another node of the switched network. If the answer is positive, this retransmission is done at the state referenced 903, and then there is a passage to the state referenced 904. If not, there is a direct passage to the state referenced 904 in which it is verified that the second packet is intended for this destination node.

If the second packet is not intended for this destination node, there is a passage to the state referenced 913 in which the second packet is swallowed (namely read in order to release the stream, but not stored) and there is a return to the state referenced 901 (of waiting for the following second packet).

If the second packet is intended for this destination node, there is a passage to the state referenced 905 in which the SAR module reads the header of the second packet and decides whether the second packet must be swallowed or stored in the DPRAM. If the destination node has already received a second packet whose header comprises a synchronization marker, from the time when the data stream considered is open, then the SAR module goes into the state referenced 906. If not, the SAR module ascertains that a synchronization marker is present in the header of the second packet. If the answer is positive (i.e., a marker is present), it goes into the state referenced 906. If the answer is negative (with no marker), it goes into the state referenced 913 already discussed here above.

In the state referenced 906, the header of the second packet is analyzed to find out if the change in access level has been detected in the data stream. If the answer is positive, the operation passes to the step referenced 907 in which the SAR module 240 determines whether the new access level is accepted or not by the destination node. For this purpose, the SAR module reads one of its registers (referenced 720 in FIG. 3), indicating, for each of the possible access levels, if it is accepted or not by this destination node (see description of FIG. 10 below). If it is an accepted access level, there is a passage to the state referenced 909, in which the "true" state is assigned to a variable "access_OK". If not, there is a passage to the state referenced 908, in which the "false" state is assigned to this variable "access_OK".

The state referenced 910 is then reached. It is reached directly if there is a negative response to the test of the state referenced 906 (no change in access level). In this state referenced 910, the state of the Boolean variable "access_OK" is tested: if its state is "true", there is a passage to the state referenced 912 in which the second packet is accepted, and its contents are stored in the DPRAM; if its state is "false", there is a passage to the state referenced 911 in which the second packet is swallowed. There is then a return to the state referenced 901 to reach a new second packet.

Figure 10:
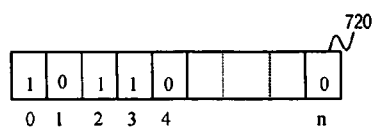
FIG. 10 shows a register indicating whether, for each of the possible access levels, it is accepted or not by this destination node.

Referring now to FIG. 10, an example of the register 720 is shown indicating, for each of the possible access levels, whether or not it is accepted by the destination node.

The register is an n-bit register, n being the number of possible access levels managed by the system. Each bit is a Boolean flag, which is set at "1" if the access level corresponding to its bit number is an accepted level, and which is set at "0" if not. In the example shown, only the access levels 0, 2 and 3 are accepted by the destination node concerned. As indicated here above, this register can be pre-filled or filled by the main user (i.e., by one of the parents in the case of a parental control type of application) by all appropriate means (keyboard, screen, etc.)

What is claimed is:

1. A method for the insertion of broadcast control information for the control of the broadcasting of a data stream in a heterogeneous network, the heterogeneous network including at least one entry sub-network conveying first packets and a basic network conveying second packets, the entry sub-network being connected to the basic network by an entry node configured to form the second packets from at least part of at least one first packet, wherein the entry node performs the method comprising:

successively receiving first packets from the entry sub-network;

associating an access level with each first packet from a plurality of access levels according to a predetermined policy;

forming each second packet by including in each second packet one or more first packets or parts of a first packet associated with a first access level, and inserting into each second packet broadcast control information corresponding to the first access level; and transmitting the second packets formed in the forming step into the basic network, wherein, if the access level changes from the first access level to a second access level between successive first packets of the data stream, the entry node (a) forms a synchronization second packet by inserting a synchronization marker in a second packet, and (b) reduces the size of the second packet preceding the synchronization second packet such that the start of the payload information of the synchronization second packet corresponds to the start of a first packet associated with the second access level.

2. A method according to claim 1, wherein the entry node modifies the size of the synchronization second packet, so that the sum of the reduced size of the preceding second packet and the modified size of the synchronization second packet is equal to the normal size of a second packet.

3. A method according to claim 1, wherein the entry node manages a mechanism, put into effect at each change in access level, for obtaining a current distance in memory, between a stored position of a forthcoming start of a first packet and a current position of a read pointer used for the construction of the second packets.

4. A method according to claim 3, wherein the entry node performs steps comprising:

the entry node obtaining said current distance;

if the current distance is equal to zero, the entry node generating and sending a synchronization second packet for which the start of the payload information corresponds to the start of the payload information of a first packet associated with the second access level, the synchronization second packet comprising a synchronization marker;

if the current distance is smaller than the normal size of a second packet, the entry node generating and sending a truncated second packet, known as a preceding second packet, whose reduced size is equal to the current distance, and then generating and sending a synchronization second packet for which the start of the payload information corresponds to the start of the payload information of a first packet associated with the second access level, the synchronization second packet comprising a synchronization marker; and if the current distance is greater than or equal to the normal size of the second packet, the entry node sending a normal-sized second packet which is not a synchronization second packet.

5. A method according to claim 1, wherein, at each change in access level, the entry node also inserts an access level change marker into the synchronization second packet.

6. A method according to claim 1, wherein the association of an access level with each first packet is based upon restriction on the use of the data stream and wherein the access level comprises use restriction information.

7. A method according to claim 1, wherein the association of an access level with each first packet is based on the use of a plurality of time slots, and wherein the entry node:
(a) obtains a time slot, among the plurality of time slots, that includes the instant of processing, by the entry node, of a first packet; and
(b) associates one of the access levels with the first packet as a function of the time slot obtained.

8. A method according to claim 7, wherein the association of an access level with each first packet is based on the use of the plurality of time slots and said plurality of pieces of control information, and
wherein the entry node:
(a) obtains the time slot, among the plurality of time slots, that includes the instant of processing, by the entry node, of a particular first packet;
(b) obtains at least one piece of control information, from among the plurality of pieces of control information, contained in the particular first packet; and
(c) associates one of the access levels with the particular first packet as a function of the time slot obtained and said at least one piece of control information obtained.

9. A method according to claim 1, wherein the association of an access level with each first packet is based on the use of a plurality of pieces of control information that can be contained in the first packets, and
wherein the entry node:
(a) obtains at least one piece of control information, from among the plurality of pieces of control information, contained in a particular first packet; and
(b) associates one of the access levels with the particular first packet as a function of said at least one piece of control information obtained.

10. A method according to claim 1, wherein the data stream is transmitted by an entry terminal, and
wherein the entry terminal is a digital type of terminal connected to the entry sub-network and directly generating the data stream in the form of first packets.

11. A method according to claim 1, wherein the data stream is transmitted by an entry terminal, and
wherein the entry terminal is an analog type terminal, connected to the entry sub-network by means of an independent adapter enabling a conversion, into first packets, of the data stream generated in the form of analog signals by the entry terminal.

12. A method according to claim 1, wherein the data stream is transmitted by an entry terminal,
wherein the entry terminal is an analog type terminal directly connected to the entry node, and
wherein the entry node integrates an adapter enabling a conversion, into first packets, of the data stream generated in the form of analog signals by the entry terminal.

13. A method according to claim 1, wherein the data stream is transmitted by an entry terminal, and
wherein the entry terminal is integrated into the entry node and the entry node directly generates the data stream in the form of first packets.

14. A non-transitory computer-readable storage medium storing computer program instructions that when executed by a computer perform the method of claim 1.

15. An entry node for the insertion of broadcast control information for the control of the broadcasting of a data stream transmitted in a heterogeneous network, the heterogeneous network including at least one entry sub-network conveying first packets and a basic network conveying second packets, the entry node being connected to the basic network and to the entry sub-network, wherein the entry node comprises a memory and is configured to:
successively receive first packets from the entry sub-network;
associate an access level with each first packet from among a plurality of access levels according to a predetermined policy;
form each second packet by including in each second packet one or more first packet or parts of a first packet associated with a first access level;
insert, into each second packet, broadcast control information corresponding to the first access level;
detect a change in access level between the first access level and a second access level between successive first packets of the data stream;
form a synchronization second packet by inserting a synchronization marker in a second packet;
reduce the size of the second packet preceding the synchronization second packet such that the start of the payload information of the synchronization second packet corresponds to the start of a first packet associated with the second access level; and
transmit second packets into the basic network.

16. An entry node according to claim 15, further being configured to modify the size of the synchronization second packet, so that the sum of the reduced size of the preceding second packet and the modified size of the synchronization second packet is equal to the normal size of a second packet.

17. An entry node according to claim 15, further being configured to, at each change in access level, manage a mechanism to obtain a current distance in memory, between a stored position of a forthcoming start of a first packet and a current position of a read pointer used for the construction of the second packets.

18. An entry node according to claim 17, further being configured to:
if the current distance is equal to zero, generate and send a synchronization second packet for which the start of the payload information corresponds to the start of the payload information of a first packet associated with the second access level, the synchronization second packet comprising a synchronization marker;
if the current distance is smaller than the normal size of a second packet, generate and send a truncated second packet, known as a preceding second packet, whose reduced size is equal to the current distance, and then generate and send a synchronization second packet for which the start of the payload information corresponds to the start of the payload information of a first packet associated with the second access level, the synchronization second packet comprising a synchronization marker; and
if the current distance is greater than or equal to the normal size of the second packet, send a normal-sized second packet which is not a synchronization second packet.

19. An entry node according to claim 15, further being configured to insert, at each change in access level, an access level change marker into the synchronization second packet.

20. An entry node according to claim 15, wherein the policy of association of an access level with each first packet is based upon restriction on the use of the data stream, and
wherein the access level comprises use restriction information.

21. An entry node according to claim 15, wherein the policy of association of an access level with each first packet is based on the use of a plurality of time slots, and
wherein the entry node is further configured to:

(a) obtain a time slot, among the plurality of time slots, that includes the instant of processing, by the entry node, of a first packet; and
(b) associate one of the access levels with the first packet as a function of the time slot obtained.

22. An entry node according to claim 21, wherein the policy of associating an access level with each first packet is based on the use of the plurality of time slots and the plurality of pieces of control information, and
wherein the entry node is further configured to:
(a) obtain the time slot, among the plurality of time slots, that includes the instant of processing, by the entry node, of a particular first packet;
(b) obtain at least one piece of control information, from among the plurality of pieces of control information, contained in the particular first packet; and
(c) associate one of the access levels with the particular first packet as a function of the time slot obtained and the at least one piece of control information obtained.

23. An entry node according to claim 15, wherein the policy of associating an access level with each first packet is based on the use of a plurality of pieces of control information that can be contained in the first packets, and
wherein the entry node is further configured to:
(a) obtain at least one piece of control information, from among the plurality of pieces of control information, contained in a particular first packet; and
(b) associate one of the access levels with the particular first packet as a function of the at least one piece of control information obtained.

24. An entry node according to claim 15, wherein the entry node is directly connected to an entry terminal of analog type, which transmits the data stream, and
wherein the entry node integrates an adapter enabling the conversion, into first packets, of the data stream generated in the form of analog signals by the entry terminal.

25. An entry node according to claim 15, wherein the entry node comprises an entry terminal, which transmits the data stream, and
wherein the entry node is further configured to directly generate the data stream in the form of first packets.

26. An entry node according to claim 15, wherein the heterogeneous network is a home audiovisual network.

27. An entry node according to claim 15, wherein the first packets are IEEE 1394 type packets.

28. An entry node according to claim 15, wherein the basic network is a switched network.

* * * * *